Dec. 23, 1947.  T. W. ALLMOND  2,432,977
HIGHWAY LIGHT
Filed June 8, 1945
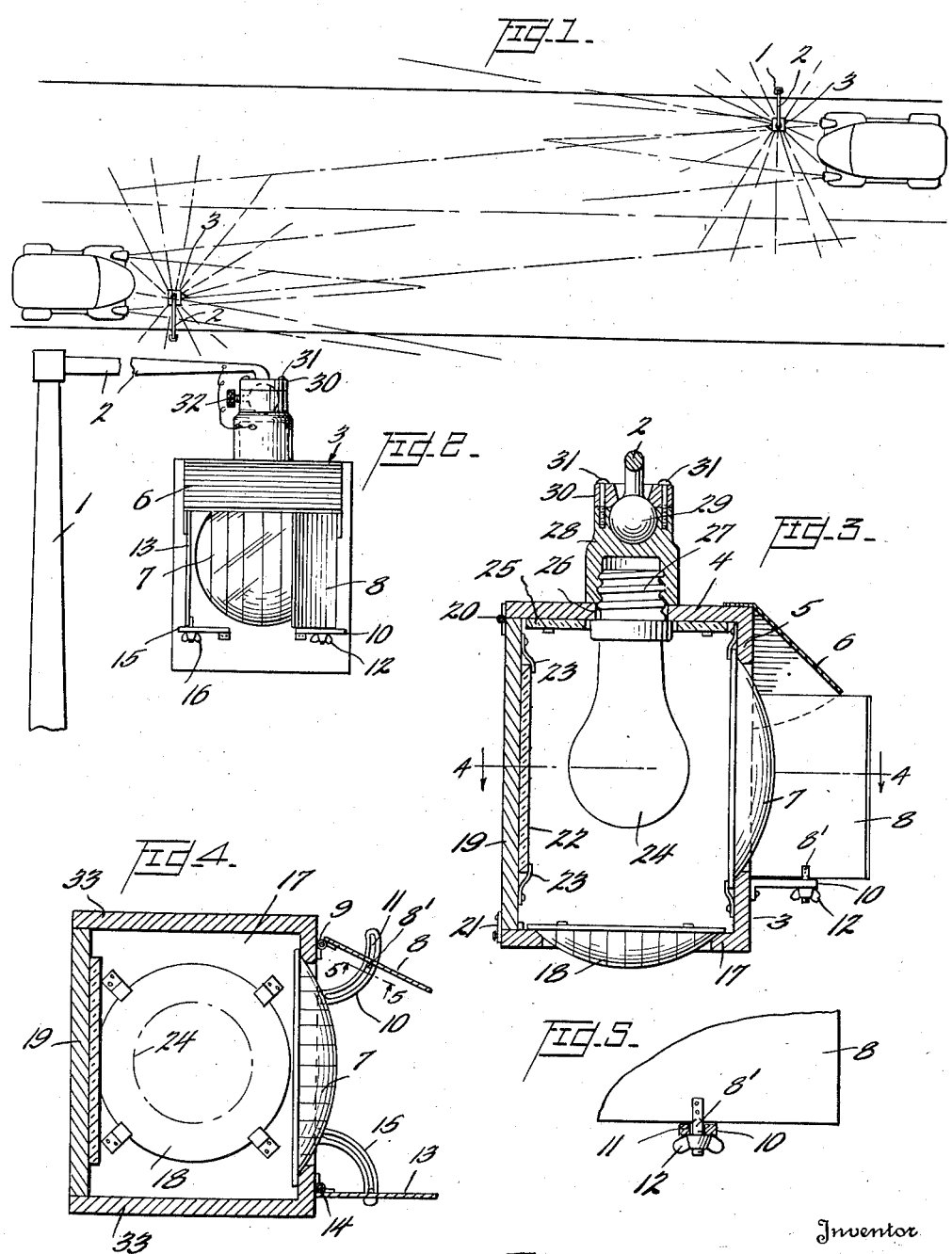
Inventor
Thomas W. Allmond,
By Parker Cook.
Attorney Patented Dec. 23, 1947

2,432,977

UNITED STATES PATENT OFFICE 2,432,977

HIGHWAY LIGHT

Thomas W. Allmond, Atlantic City, N. J.

Application June 8, 1945, Serial No. 598,277

1 Claim. (Cl. 240—25)

My invention relates to new and useful improvements in highway lights and has for an object to produce a light that will direct a beam along the highway in the direction in which the traffic flows.

For the vehicles moving on the right side of the road or highway, the light will be thrown in a path in the same direction of the moving vehicles, while on the left of the road the position of the light will be reversed so that in this instance the beam of light is thrown in the same direction that the vehicles are moving on the left.

Still another object of the invention is to provide a highway light that is open only on its face and that face pointing in the direction of the moving traffic on its side of the highway so that the light does not shine in the face of the oncoming vehicle driver from the rear of the light.

Still another object of the invention is to provide a light that not only throws the directing beam in the direction the vehicles are proceeding, but will also throw a diffused light on the highway beneath the light and over on the adjacent lane to form a light screen to thus cut down the glare of the headlights of approaching vehicles.

Still another object of the invention is to provide a light having a universal joint or other similar arrangement built therein so that when the lights are installed along the highway, they may be adjusted for elevation so that the light may extend as far forwardly as practical after which the light will be securely locked in a set position.

Also, the shutter may be adjusted so that the beam will keep to its desired side of the highway and after the shutter is once set, it will be locked for permanent service.

Still another object of the invention is to provide a light to be used along the roads and highways that will provide the desired illumination for the highway, but each light only projected along one half of the highway and that extending in the direction of the flow of traffic with the addition of a colored light, preferably amber, to be thrown downwardly on the road beneath the light to thus form a light screen which will materially cut down the glare from the headlights of approaching cars.

Still another object of the invention is to provide a universal adjustable light together with adjustable shutters so that the light may be used as a left or right, and to so construct the light as to be readily and easily accessible for insertion or removal of the lamp.

Still another object of the invention is to provide an exceedingly simple form of light preferably rectangular in shape in the front of which will be positioned a suitable lens having shutters on the opposite side thereof and a cover extending partly over the shutters together with an open bottom in which there is to be preferably fitted an amber lens and wherein the back is provided with a hinged cover so that the parts may be readily assembled, new lens installed or a new lamp fitted without difficulty.

With these and other objects in view, the invention consists of certain new and novel arrangements and combination of parts as will be hereinafter more fully described and pointed out in the claim.

Referring now to the drawings showing a preferred embodiment:

Fig. 1 is a diagramatic view showing the staggered lights along the opposite sides of the highway and showing the manner in which the lights both illuminate the highway and screen the lights from the oncoming headlights;

Fig. 2 is a front elevation of my improved light;

Fig. 3 is a vertical section on an enlarged scale;

Fig. 4 is a horizontal section taken on line 4—4 of Fig. 3; and

Fig. 5 is an enlarged fragmentary section taken on line 5—5 of Fig. 4.

Referring now more particularly to the several views and for the moment to Fig. 2, there will be seen a standard 1 with the overhanging arm 2 on the end of which the highway light 3 is mounted for universal adjustment.

As heretofore mentioned, these lights are to be positioned on the opposite sides of the highway or road and preferably in a staggered relationship while the distance between the lights may be determined to provide the desirable illumination for the highway.

The light proper or housing is shown as being rectangular but its shape might be changed providing it will hold the different elements and operate like the rectangular shaped one.

As shown in Figs. 2 and 3 there is the top 4, the front face 5 and a permanent top shade 6 which extends downwardly partly in front of the front lens 7. This lens may be of any desired shape or construction so that it will throw a concentrated beam far out in front of the light.

On the front face, as may also be seen in Figs. 2 and 3, there is the right hand shutter 8 pivoted as at 9, there being an arcuate arm 10 secured just beneath the shutter with the slot 11 therein, in which travels the stud 8' which is secured to the bottom of the shutter 8.

There may be also seen a wing nut 12 which is threaded on the lower end of the stud 8' to lock the shutter in position.

On the opposite sides of the lens 7 is a like shutter 13 which is pivoted as at 14 and may be adjusted in a similar supporting arm 15, this shutter also being held in position by the wing nut 16.

It might be mentioned that two shutters are provided so that the lights might be used as a left and right, as the light that is positioned at the right will practically utilize only the left shutter and the light that shines to the right side of the road will not work any serious disadvantage, as in case it is necessary for a driver to cut far over to the right of the road, the more illumination there is, the safer it is for the driver.

The bottom 17 of the light is cut out and provided with the lens 18, and this lens is preferably yellow or amber and the beams more diffused so that it not only will illuminate its own side of the road, but also the opposite side, and furthermore, will form a light screen so that the beams from the headlights from approaching cars will, when cutting through this amber light, but cut down and thus overcome the blinding glare usually encountered.

The lens 18 as mentioned may be a wide angle lens rather than a concentrated beam so that the angle of light area will tend to extend across the entire highway.

Also, it is well known that an amber light may be more easily seen in foggy weather than the white light and thus will be of assistance to the drivers especially along seaboards or coastal highways where fog is more prevalent.

The rear face of the light is provided with a removable back 19 which is hinged as at 20 and may be held in its closed position by the latch 21.

Also, on the inner face of the back 19 is a reflecting mirror 22 which is held in position by the lugs 23 and this mirror is directly in back of the lamp 24 which is in a horizontal line with the forward lens 7. Thus, the reflected light will be added to the direct light passing through the lens 7.

In a like manner, there may be a mirror 25 supported on the undersurface of the top 4 so that the reflected light from the lamp 24 will also pass down through the amber lens 18.

The top 4 is provided with the opening 26 and over this opening is secured a socket 28 in which may be threaded the base 27 of the lamp 24.

I may use various forms of sockets but as illustrative of the invention, I have shown one wherein the top of the socket is formed to receive a ball 29 formed on the end of the arm 2 and over this ball will be the cap 30 which will be held in place by the cap bolts 31.

Also, there may be seen in Fig. 2, a set screw 32. Thus, after the light is once arranged for elevation, that is, for focusing the beam along the highway, the screws 31 and the set screw 32 may be securely fastened so that after the light is once focused it will not have to be changed until it has to be repaired.

Also, by providing a universal movement, the light may be focused for traverse and after it is properly positioned, if used on the right side of the road as in Fig. 1 (reading from right to left) the left shutter will be moved inwardly until such time as the beam from the lens 7 will light up the right side of the road, but the beam will not extend over into the left side of the road. Thus, this projected light will never shine in the eyes of a driver approaching in the opposite direction.

If the light is to be used on the left hand side of the road (still reading from right to left in Fig. 1) then the right shutter will be adjusted so that the beam extends along the left side of the road but will not shine over on the right side of the road.

Thus, it will be seen that the highway is well illuminated on the both sides of the road but the traffic on the right side of the road (still reading Fig. 1 right to left) will never have the light shining in the eyes of the driver as the rear face of the lamp will be towards him as he approaches it, while the same condition exists over on the left side of the road.

Furthermore, by providing the colored lens or amber lens or other desired diffusing lens, the roadway beneath the lights will be illuminated and also this yellow light will cut down the glare from approaching drivers whether they approach from the right or the left.

From the foregoing it will be seen that I have provided an extremely simple light that will illuminate the respective sides of the highway to make for safer driving and will also provide a diffused light which will both illuminate the roadway beneath the lights and provide a form of screen to cut down the glare from the headlights of the oncoming vehicles.

It will also be understood that the housing does not have to be the exact shape as shown, and the means for a universal adjustment might be changed without in any way departing from the spirit or scope of the invention.

Having thus described the same what I claim is new and desire to secure by Letters Patent is:

In a highway light a housing, a socket for a lamp positioned in the top of the housing, means for universal adjustment of the housing, an illuminating lens in the front of the housing, a shade screen positioned near the top of the lens and pivoted lockable shutters at the opposite sides of the lens, means for holding the shutters in a set position, a colored lens in the bottom of the housing, a pivotal back, a reflecting mirror secured to said back and a reflecting mirror secured on the inner surface on the top of the housing, the said shutters being selectable and adapted to restrict the light area from the front lens depending on whether the light is to be used as a left or right, and the colored lens in the bottom of the housing adapted to form a screen of colored light over the highway and adapted to cut down the glare from the headlights of vehicles approaching from opposite directions.

THOMAS W. ALLMOND.

REFERENCES CITED

The following references are of record in the file of this patent:

UNITED STATES PATENTS

| Number | Name | Date |
| --- | --- | --- |
| 1,622,272 | Benjamin | Mar. 29, 1927 |
| 1,747,506 | Erskine | Feb. 18, 1930 |
| 1,929,298 | Wessels | Oct. 3, 1933 |
| 1,955,602 | Lamblin-Parent | Apr. 17, 1934 |
| 2,252,022 | Morris et al. | Aug. 12, 1941 |
| 2,275,734 | Clement | Mar. 10, 1942 |

FOREIGN PATENTS

| Number | Country | Date |
| --- | --- | --- |
| 800,803 | France | May 11, 1936 |